US007856460B2

(12) United States Patent
Yamasaki et al.

(10) Patent No.: US 7,856,460 B2
(45) Date of Patent: Dec. 21, 2010

(54) DEVICE, METHOD, AND COMPUTER PROGRAM PRODUCT FOR STRUCTURING DIGITAL-CONTENT PROGRAM

(75) Inventors: Tomohiro Yamasaki, Kanagawa (JP); Hideki Tsutsui, Kanagawa (JP); Koji Urata, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 557 days.

(21) Appl. No.: 11/896,866

(22) Filed: Sep. 6, 2007

(65) Prior Publication Data
US 2008/0077611 A1  Mar. 27, 2008

(30) Foreign Application Priority Data
Sep. 27, 2006 (JP) .............................. 2006-263548

(51) Int. Cl.
G06F 7/02 (2006.01)
(52) U.S. Cl. ..................................................... 707/915
(58) Field of Classification Search .................. 705/26, 705/27; 707/737, 838; 369/30.08, 32, 53, 369/60, 54; 704/278; 381/77; 709/229
See application file for complete search history.

(56) References Cited

U.S. PATENT DOCUMENTS

| 5,892,535 | A * | 4/1999 | Allen et al. ..................... 725/36 |
| 5,924,071 | A * | 7/1999 | Morgan et al. ............... 704/278 |
| 7,243,062 | B2 * | 7/2007 | Wark ........................... 704/214 |
| 2002/0010652 | A1 * | 1/2002 | Deguchi ........................ 705/26 |
| 2002/0135607 | A1 * | 9/2002 | Kato et al. .................... 345/716 |
| 2002/0135608 | A1 * | 9/2002 | Hamada et al. ............. 345/723 |
| 2003/0018662 | A1 * | 1/2003 | Li ............................ 707/500.1 |
| 2003/0086568 | A1 * | 5/2003 | Kato et al. .................... 380/201 |
| 2003/0185442 | A1 * | 10/2003 | Yang et al. .................. 382/172 |
| 2003/0235402 | A1 * | 12/2003 | Seo et al. ....................... 386/95 |
| 2004/0086258 | A1 | 5/2004 | McGee et al. |
| 2005/0060741 | A1 | 3/2005 | Tsutsui et al. |
| 2005/0060745 | A1 * | 3/2005 | Riedl et al. ................... 725/42 |
| 2005/0232588 | A1 * | 10/2005 | Hosoda et al. ............... 386/69 |
| 2006/0101065 | A1 | 5/2006 | Tsutsui et al. |

(Continued)

FOREIGN PATENT DOCUMENTS

EP  1818933 A1  8/2007

(Continued)

OTHER PUBLICATIONS

Extended European Search Report dated Jan. 23, 2008, for corresponding European Application No. 07017470.1-2223.

Primary Examiner—Cheyne D Ly
(74) Attorney, Agent, or Firm—Finnegan, Henderson, Farabow, Garrett & Dunner, L.L.P.

(57) ABSTRACT

A program structuring device includes a play-list collecting unit that collects a play list for a content in which a time series is defined; a first storage unit that stores cutoff points that appear in the play list and are breakpoints of a program structure of the content, in correspondence with a frequency of appearance of each of the cutoff points; a calculating unit that calculates a level of relevance between scene segments defined by the cutoff points from the frequency of appearance of each of the cutoff points; an extracting unit that extracts multi-level chapter divisions based on the level of relevance; and a second storage unit that stores the extracted multi-level chapter divisions structured into a tree form.

12 Claims, 18 Drawing Sheets

U.S. PATENT DOCUMENTS

| | | |
|---|---|---|
| 2006/0112098 A1* | 5/2006 | Renshaw et al. ................ 707/7 |
| 2007/0106693 A1* | 5/2007 | Houh et al. ............... 707/104.1 |
| 2007/0118801 A1* | 5/2007 | Harshbarger et al. ........ 715/730 |
| 2008/0077264 A1* | 3/2008 | Irvin et al. .................... 700/94 |

FOREIGN PATENT DOCUMENTS

| | | | |
|---|---|---|---|
| GB | 2357002 | * | 6/2001 |
| JP | 2004-193871 | | 7/2004 |
| JP | 2005-167452 | | 6/2005 |
| WO | WO 2005/052937 A1 | | 6/2005 |
| WO | WO 2006/059519 A1 | | 6/2006 |

* cited by examiner

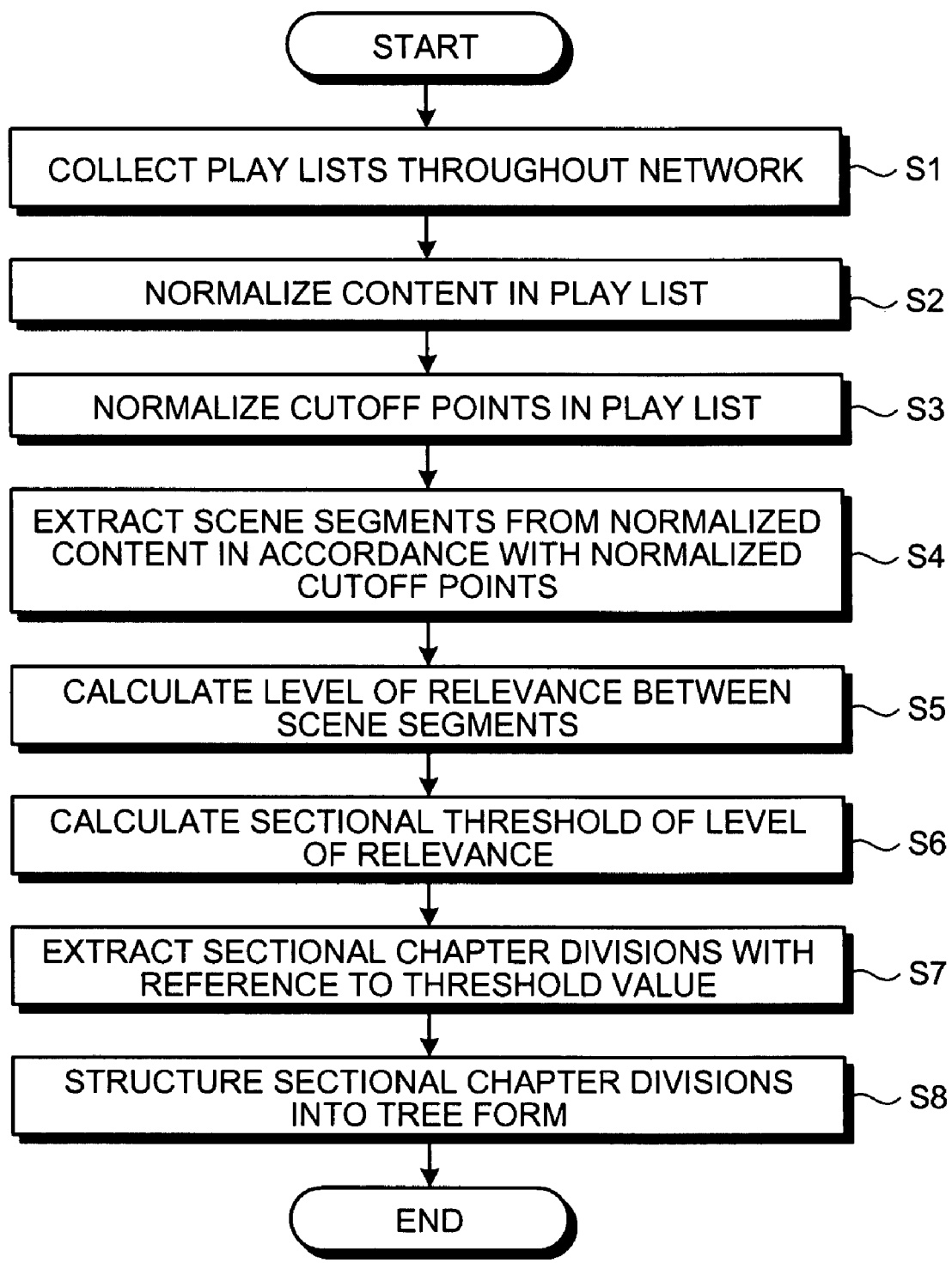

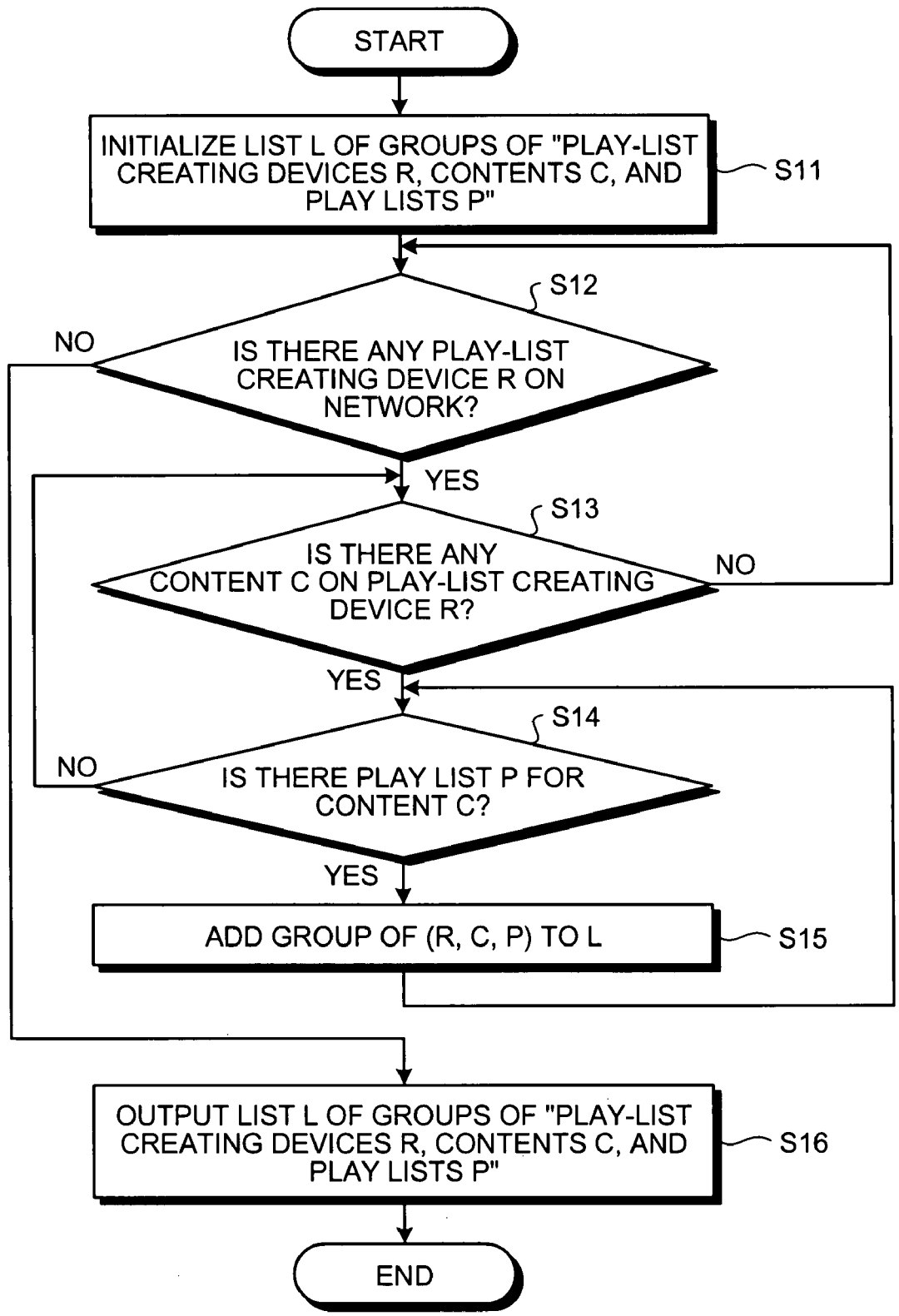

FIG.6

| IDENTIFIER | MODEL | TYPE | SERIAL NUMBER | IP ADDRESS |
|---|---|---|---|---|
| R1 | A000 | HDD RECORDER | 000-0001 | XX,XX,XX,XX |
| R2 | A000 | HDD RECORDER | 000-0002 | YY,YY,YY,YY |
| R3 | B111 | NOTEBOOK PC | 111-0001 | ZZ,ZZ,ZZ,ZZ |
| ... | ... | ... | ... | ... |

FIG.7

| IDENTIFIER | TITLE | TYPE | PRODUCER | AIR TIME |
|---|---|---|---|---|
| C1 | FOREST FRIENDS | TV BROADCAST | AAA STATION | 10:00-11:30, JANUARY 23, 2006 |
| C2 | WEATHER OUTLOOK FOR TOMORROW | TV BROADCAST | AAA STATION | 11:30-11:45, JANUARY 23, 2006 |
| C3 | CUSHION | DVD | BBB COMPANY | — |
| C4 | SNOWMAN | VOD | CCC STATION | — |
| C5 | FOREST FRIENDS | TV BROADCAST | AAC STATION | 10:00-11:30, JANUARY 23, 2006 |
| ... | ... | ... | ... | ... |

| IDENTIFIER | CONTENT IDENTIFIER | SCENE SEGMENT | SCENE DESCRIPTION |
|---|---|---|---|
| P1 | C1 | 00:00:00:-00:25:00, | OPENING REMARKS AND FIRST QUESTION |
| P2 | C2 | 00:00:30:-00:55:00<br>00:15:00:-00:45:00, | SECOND QUESTION<br>SHOT OF PERSONALITY A |
| P3 | C3 | 01:00:00:-02:00:00, | THIRD AND FOURTH QUESTIONS |
| ... | ... | 02:15:00:-02:30:00 | SHOT OF PERSONALITY A |
|  |  | 00:25:00:-00:30:00<br>... | ... |

FIG.10

BROADCAST STATION CORRESPONDENCE

| BROADCAST STATION NETWORK | AREA | CHANNEL | BROADCAST STATION |
|---|---|---|---|
| AAA NETWORK | KANTO | 1 | AAA STATION |
| AAA NETWORK | CHUBU | 1 | AAB STATION |
| AAA NETWORK | KANSAI | 2 | AAC STATION |
| XXX NETWORK | KANTO | 4 | XXX STATION |
| ... | ... | ... | ... |

PROGRAM CORRESPONDENCE

| PROGRAM | AREA | CHANNEL | BROADCAST STATION | AIR TIME |
|---|---|---|---|---|
| FOREST FRIENDS | KANTO | 1 | AAA STATION | MONDAYS, 10:00-11:30 AM |
| FOREST FRIENDS | CHUBU | 1 | AAB STATION | WEDNESDAYS, 2:00-3:30 PM |
| FOREST FRIENDS | KANSAI | 2 | AAC STATION | MONDAYS, 10:00-11:30 AM |
| ... | ... | ... | ... | ... |

FIG.11

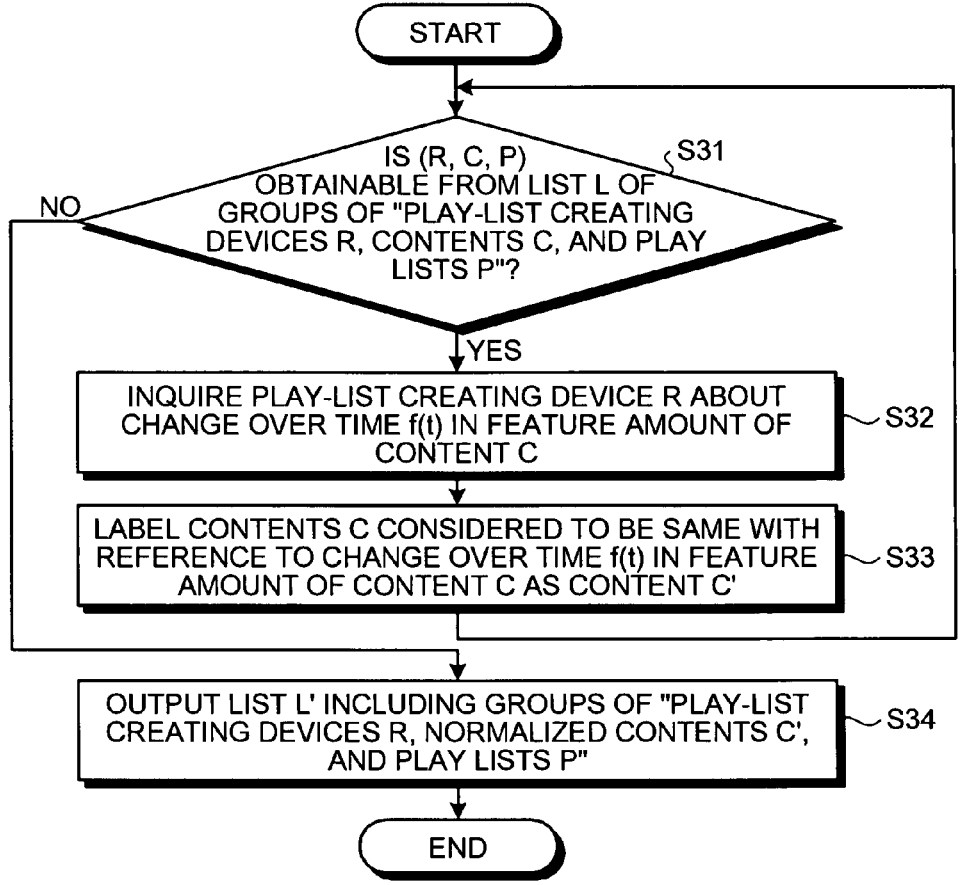

FREQUENCY OF
APPEARANCE F OF
EACH CUTOFF
POINT IN C1'

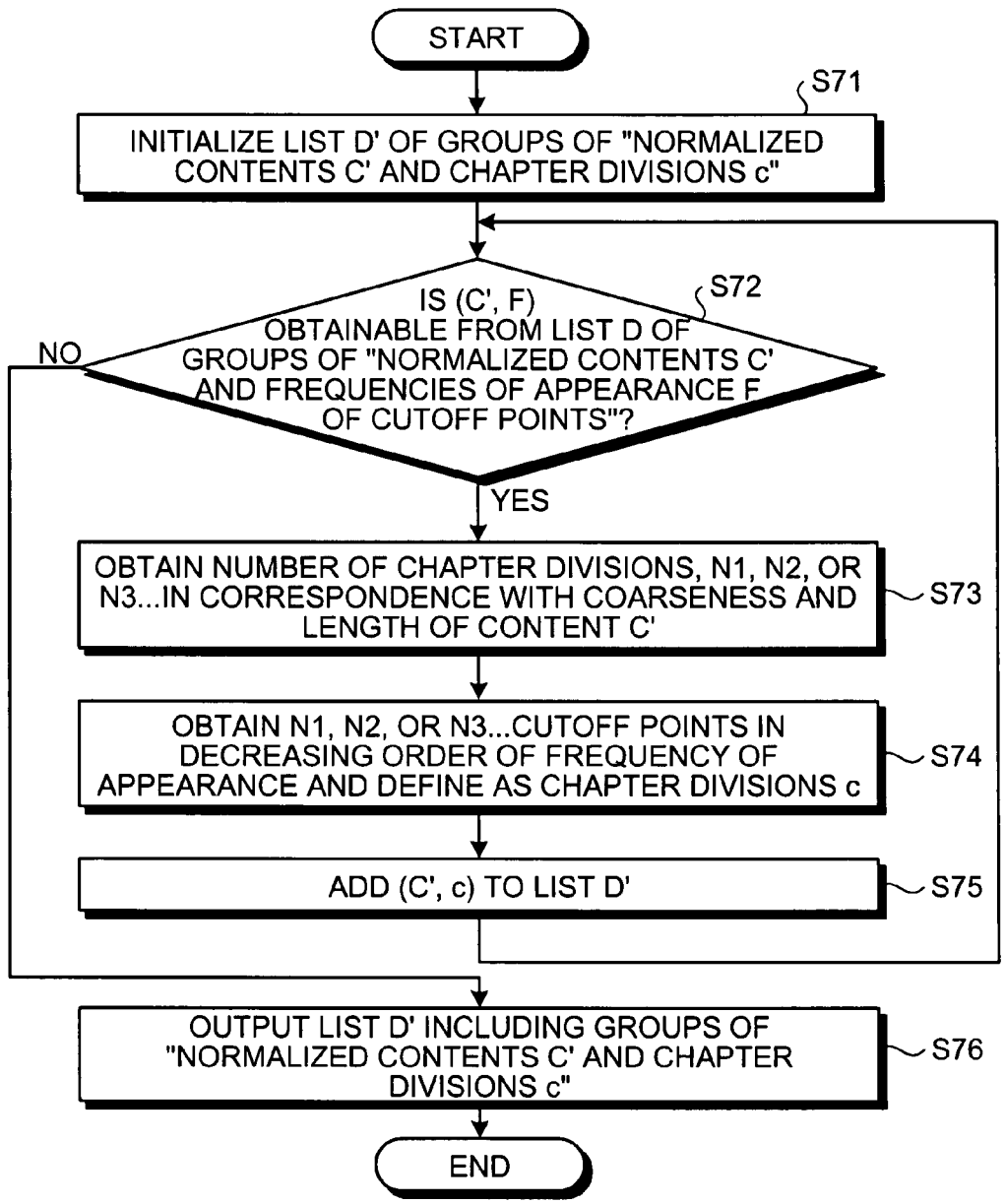

|  | LARGE SEGMENTS | MEDIUM SEGMENTS | SMALL SEGMENTS |
|---|---|---|---|
| COEFFICIENT OF THRESHOLD | 1/4 | 2/4 | 3/4 |

FIG.23

```xml
<?xml version="1.0"?>
<partition contentsId="C1">
  <chapter number="1" startTime="00:00:00" endTime="00:20:00">
    <chapter number="1-1" startTime="00:00:00" endTime="00:10:00">
    </chapter>
    <chapter number="1-2" startTime="00:10:00" endTime="00:20:00">
    </chapter>
  </chapter>
  <chapter number="2" startTime="00:20:00" endTime="00:25:00">
  </chapter>
  <chapter number="3" startTime="00:25:00" endTime="01:10:00">
    <chapter number="3-1" startTime="00:25:00" endTime="00:50:00">
      <chapter number="3-1-1" startTime="00:25:00" endTime="00:35:00">
      </chapter>
      <chapter number="3-1-2" startTime="00:35:00" endTime="00:50:00">
      </chapter>
    </chapter>
    <chapter number="3-2" startTime="00:50:00" endTime="01:10:00">
     . . .
    </chapter>
  </chapter>
   . . .
</partition>
```

DEVICE, METHOD, AND COMPUTER PROGRAM PRODUCT FOR STRUCTURING DIGITAL-CONTENT PROGRAM

CROSS-REFERENCE TO RELATED APPLICATIONS

This application is based upon and claims the benefit of priority from the prior Japanese Patent Application No. 2006-263548, filed on Sep. 27, 2006; the entire contents of which are incorporated herein by reference.

BACKGROUND OF THE INVENTION

1. Field of the Invention

The present invention relates to a device, method, and computer program product for structuring digital-content programs.

2. Description of the Related Art

In accordance with the recent widespread use of broadband and the like, the amount of digital content distribution has been increasing. Techniques for efficiently managing and processing the increasing amount of digital content on a computer have been considered, with which metadata is added to the digital content.

When the digital content is video, for example, a desired scene can be readily located or searched for if metadata indicating "the beginning of a subsequent scene" is attached to the time series. This improves the convenience of users. In general, video content is divided in advance into chapters by the content provider by use of metadata such as delimiting information used in a movie to divide into scenes. However, it is burdensome for the content provider to accurately add metadata to the entire content.

Recently, individual users (viewers) of an HDD recorder equipped with a play-list creating function create a play list by adding metadata to the time series of the video content. JP-A 2004-193871 (KOKAI) teaches a technique of adding metadata by a user. According to this technique, metadata created by an individual user (viewer) is placed to the public so that it can be shared by multiple users (viewers).

According to JP-A 2004-193871 (KOKAI), however, because metadata created by different users (viewers) are shared, the metadata may not always provide accurate chapter divisions for the content.

On the other hand, instead of the content provider or user dividing the content into chapters, it has been suggested that metadata is extracted automatically from the information of the content itself to achieve chapter division. The following methods are suggested:

(1) A method of extracting metadata from audio information of the video content;

(2) A method of extracting metadata from text information such as subtitles extracted from the video content or from text information included in the script of the video; and (3) A method of extracting metadata from image information such as camera-switching information extracted from the video content.

There are some problems yet to be solved in those methods of automatically extracting metadata from the information of the content itself.

First, when audio information in the video content is used, an abstract scene such as "sensational" can be extracted based on the loudness of cheers, or a roughly divided scene can be extracted based on a discriminative keyword. At present, however, the voice recognition technology is not accurate enough to extract a precisely divided scene. There is also a problem that information of a scene cannot be extracted during a silent interval.

Secondly, when the text information of the video content is used, a scene can be extracted by estimating the topic as tracing changes of words that appear. There is a problem, however, that this method is not applicable to a content that does not contain text information such as subtitles and scripts. Although text information may be added to the content for the purpose of scene extraction, it is more efficient to add scene information as metadata of the content at the beginning than to add text information only for scene extraction.

Thirdly, when camera-switching information of the video content is used, such information suggests extremely primitive intervals. The camera-switching information therefore cuts the content into too small segments. If the content is a quiz show or news program, where typical sequences are included in accordance with the camera-switching information, scenes of appropriate sizes can be extracted by suitably grouping the sequences. This technique is not applicable to all the digital-content programs, however. If scenes are divided into chapters of inappropriate sizes, the convenience of users may be reduced.

More specifically, there are problems such as follows:

If a scene is divided into too large chapters, the user may need to fast-forward the data to locate a desired scene, or may skip the desired scene under a skip operation.

On the other hand, if a scene is divided into too small chapters, the skip operation has to be repeated many times to reach the desired scene.

In addition, even when the same content is dealt with, the size of scenes differs from user to user, depending on the viewpoint of the user watching the content. Thus, it is difficult to decide an appropriate size of chapters into which a scene is divided.

SUMMARY OF THE INVENTION

According to one aspect of the present invention, a program structuring device includes a play-list collecting unit that collects a play list for a content in which a time series is defined; a first storage unit that stores cutoff points that appear in the play list and are breakpoints of a program structure of the content, in correspondence with a frequency of appearance of each of the cutoff points; a calculating unit that calculates a level of relevance between scene segments defined by the cutoff points from the frequency of appearance of each of the cutoff points; an extracting unit that extracts multi-level chapter divisions based on the level of relevance; and a second storage unit that stores the extracted multi-level chapter divisions structured into a tree form.

According to another aspect of the present invention, a program structuring method includes extracting scene segments from a content in which a time series is defined in accordance with cutoff points that appear in a play list created for the content and that are breakpoints of a program structure of the content; determining a level of relevance between the scene segments based on a frequency of appearance of each of the cutoff points; extracting multi-level chapter divisions as a cluster of scene segments having a high level of relevance; and structuring extracted multi-level chapter divisions into a tree form.

A computer program product according to still another aspect of the present invention causes a computer to perform the method according to the present invention.

BRIEF DESCRIPTION OF THE DRAWINGS

FIG. 4 is a flowchart of a digital-content structuring process;

FIG. 5 is a flowchart of a play-list collecting process;

FIG. 6 is a schematic diagram showing device information;

FIG. 7 is a schematic diagram showing content information;

FIG. 10 is a schematic diagram showing a correspondence table;

FIG. 11 is a flowchart of a content normalizing process;

FIG. 18 is a flowchart of a chapter division extracting process;

FIG. 19 is a schematic diagram showing an example of a correspondence table for lengths of content, coarseness of chapter divisions, and chapter divisions;

FIG. 23 is a schematic diagram showing an example of chapter divisions structured into a tree form;

DETAILED DESCRIPTION OF THE INVENTION

Figure 1:
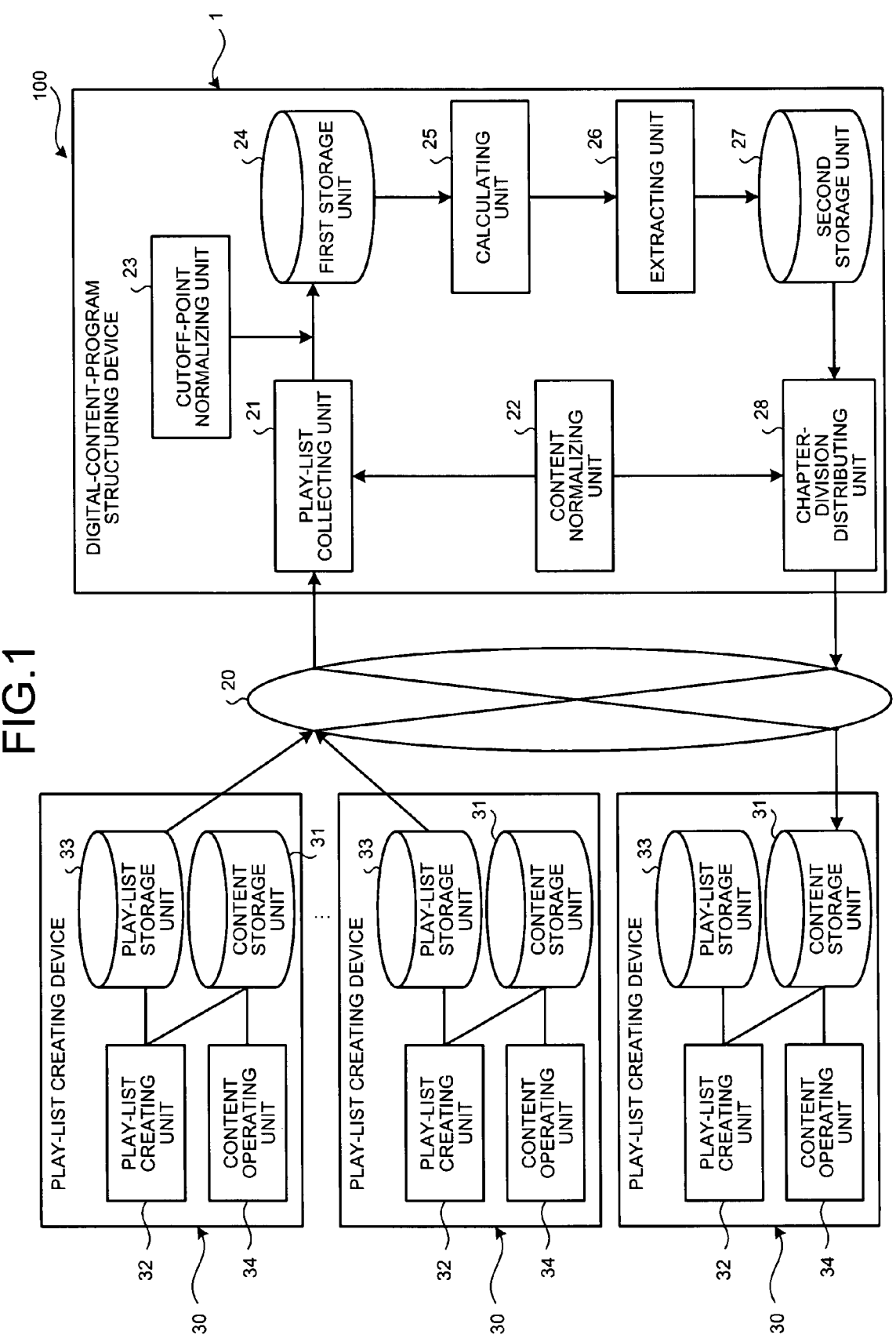
FIG. 1 is a diagram showing a structure of a digital-content-program structuring system according to an embodiment of the present invention.

Exemplary embodiments according to the present invention are explained with reference to FIGS. 1 to 25. FIG. 1 is a diagram showing a structure of a digital-content-program structuring system according to an embodiment. A digital-content-program structuring system 100 denotes a system in which a digital-content-program structuring device 1 is connected to several play-list creating devices 30 such as HDD recorders and personal computers via a network 20 such as the Internet using an Internet Protocol (IP). Although in actuality a large number of digital-content-program structuring devices 1 and play-list creating devices 30 are included in the system, a single digital-content-program structuring device 1 and three play-list creating devices 30 are illustrated in FIG. 1 for the sake of simplification of the explanation.

Each play-list creating device 30 includes a content storage unit 31 that stores various video contents; a play-list creating unit 32 that performs the play-list creating function that is well known, on the video contents stored in the content storage unit 31; a play-list storage unit 33 that stores play lists created by the play-list creating unit 32; and a content operating unit 34 that divides the video contents stored in the content storage unit 31 into chapters by use of metadata such as delimiter information contained in movie scenes. The play-list creating function of the play-list creating unit 32 indicates, for example, a function with which a play list for selecting desired items from the video contents stored in the content storage unit 31 and reproducing them in the desired order is created, and created lists are registered and controlled. Because the play-list creating function is pre-installed in an HDD recorder and a personal computer, detailed explanations are omitted. With the content storage unit 31 that stores various video contents, the play-list creating device 30 also serves as a content storage device.

Briefly speaking, the digital-content-program structuring device 1 collects through the network 20 play lists created for a content by the play-list creating devices 30. The digital-content-program structuring device 1 determines the level of relevance between scene segments included in the content, based on cutoff points that appear in each play list, and thereby structures the digital-content program.

Figure 2:
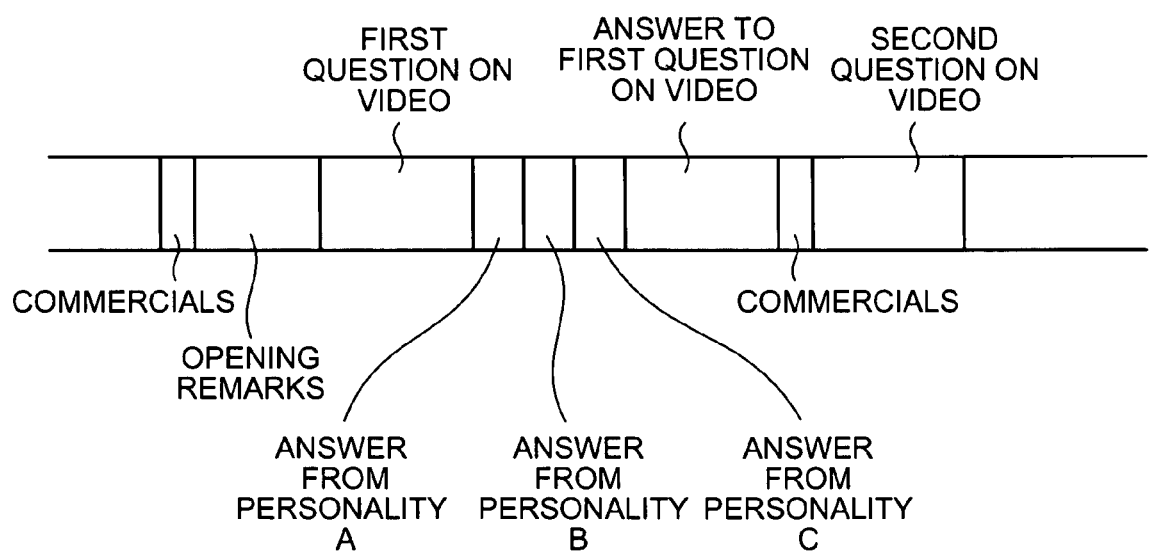
FIG. 2 is a schematic diagram showing an example of a program structure of a content having cutoff points in time series.

A cutoff point that appears in the play list indicates a breakpoint of the program structure of the content in the play list, for which details will be provided later. FIG. 2 is a schematic diagram showing an example of the program structure of the content having cutoff points in time sequence. The examples of cutoff points in the program structure of the content include "commercials", "opening remarks", "first question on video", "answer from personality A", "answer from personality B", "answer from personality C", "answer to first question on video", "commercial", "second question on video", etc.

Figure 3:
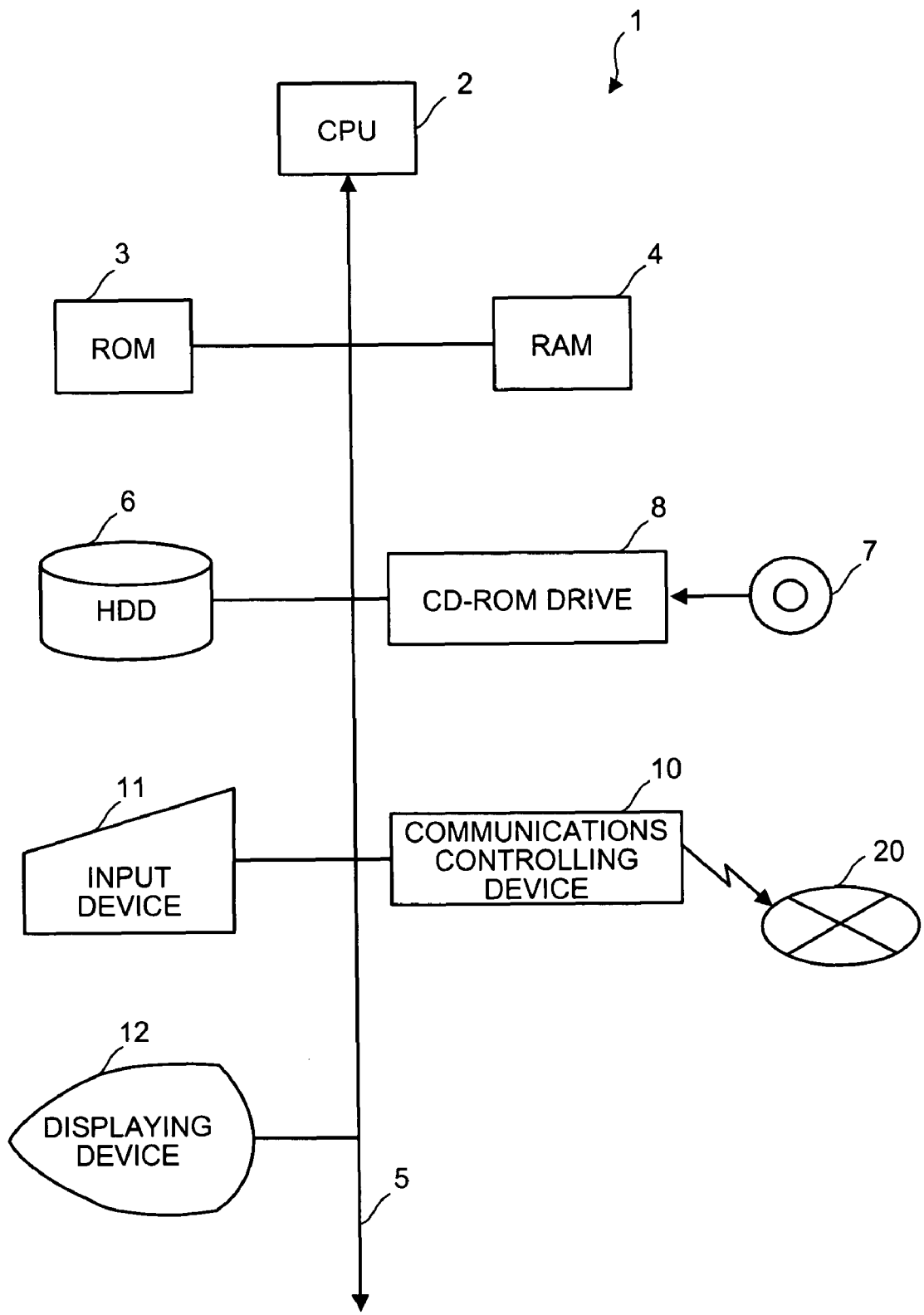
FIG. 3 is a block diagram showing a hardware structure of a digital-content-program structuring device.

The digital-content-program structuring device 1 is now explained. FIG. 3 is a block diagram showing the hardware structure of the digital-content-program structuring device 1. As illustrated in FIG. 3, the digital-content-program structuring device 1 may be a personal computer, which includes a central processing unit (CPU) 2 that serves as a main unit of the computer and centrally controls other units. The CPU 2 is connected to a read only memory (ROM) 3, which stores therein a BIOS and the like, and a random access memory (RAM) 4, which stores therein various kinds of data in a rewritable manner, by way of a bus 5.

The CPU 2 is also connected to a hard disk drive (HDD) 6, which stores various programs therein, a CD-ROM drive 8, which serves as a mechanism for reading distributed computer software programs and reads a CD-ROM 7, a communications controlling device 10 that controls communications between the digital-content-program structuring device 1 and the network 20, an input device 11 that sends various operation commands such as a keyboard and a mouse, and a displaying device 12 that displays various information such as a cathode ray tube (CRT) and a liquid crystal display (LCD), by way of the bus 5 via an input/output device that is not shown.

Because of its property of storing various kinds of data in a rewritable manner, the RAM 4 functions as a working area of the CPU 2 and serves as a buffer or the like.

The CD-ROM 7 illustrated in FIG. 3 serves as a recording medium according to the present invention and stores therein an operation system (OS) and various programs. The CPU 2 reads a program stored in the CD-ROM 7 on the CD-ROM drive 8 and installs it into the HDD 6.

The recording medium is not limited to the CD-ROM 7, but media using various systems can be adopted, examples of which include various types of optical disks such as a DVD, various types of magneto-optical disks, various types of magnetic disks such as a flexible disk, and semiconductor memories. Furthermore, a program may be downloaded from the network 20 such as the Internet by way of the communications controlling device 10 and installed in the HDD 6. In such a system, a storage device of the sender server that stores therein programs is also a recording medium covered by the present invention. The programs may be of a type that operates on a specific operating system (OS) and performs various processes as described later, part of which may be off-loaded to the OS. The programs may be included as part of a program file group that constitutes specific application software and the OS.

The CPU 2 that controls the operation of the entire system executes the processes in accordance with the programs loaded on the HDD 6, which is used as the main memory of the system.

Among the functions performed by the CPU 2 in accordance with different programs installed in the HDD 6 of the digital-content-program structuring device 1, characteristic functions of the digital-content-program structuring device 1 according to the embodiment are explained next.

As illustrated in FIG. 1, the digital-content-program structuring device 1 executes a digital-content structuring program and is thereby provided with a play-list collecting unit 21, a content normalizing unit 22, a cutoff-point normalizing unit 23, a first storage unit 24, a calculating unit 25, an extracting unit 26, a second storage unit 27, and a chapter-division distributing unit 28.

The play-list collecting unit 21 collects play lists stored in the play-list storage unit 33 of each play-list creating device 30 that is present on the network 20.

The content normalizing unit 22 performs a process of normalizing a content for which a play list is created.

The cutoff-point normalizing unit 23 performs a process of normalizing cutoff points that appear in each play list collected by the play-list collecting unit 21. More specifically, the cutoff-point normalizing unit 23 corrects the times of the cutoff points that appear in the play list in accordance with a difference between the clock of the digital-content-program structuring device 1 and the clock of the content. A cutoff point that appears in the play list denotes a breakpoint in the program structure of the content included in the play list. For instance, it is a commercial chapter. The cutoff point normalized by the cutoff-point normalizing unit 23 is brought into correspondence with the frequency of appearance of the cutoff point in the play lists collected by the play-list collecting unit 21 and stored in the first storage unit 24.

The calculating unit 25 extracts a scene segment in accordance with the cutoff points stored in the first storage unit 24 and calculates the level of relevance between the extracted scene segments, based on the frequencies of appearance of the cutoff points.

The extracting unit 26 calculates a multi-level threshold value of the relevance of the scene segments calculated by the calculating unit 25. In addition, the extracting unit 26 combines scene segments whose level of relevance exceeds the threshold value and thereby extracts multi-level chapter divisions. The extracted multi-level chapter divisions are structured into a tree form. The multi-level chapter divisions extracted by the extracting unit 26 in this manner are tree-structured and stored in the second storage unit 27.

When chapter divisions that correspond to the content stored in the content storage unit 31 of each play-list creating device 30 on the network 20 are present in the second storage unit 27, the chapter-division distributing unit 28 distributes these chapter divisions to the content storage units 31 of the play-list creating devices 30 through the network 20.

The flow of the processes conducted by the units of the digital-content-program structuring device 1 is briefly explained with reference to the flowchart of FIG. 4. The play-list collecting unit 21 collects play lists stored in the play-list storage unit 33 of each play-list creating device 30 on the network 20 (step S1). The content normalizing unit 22 normalizes the content for which a play list is created (step S2). The cutoff points that appear in each play list collected by the play-list collecting unit 21 are also normalized (step S3). Next, the calculating unit 25 extracts scene segments in accordance with the normalized content and cutoff points (step S4) and calculates the relevance between the extracted scene segments (step S5). The extracting unit 26 calculates a multi-level threshold value for the relevance of the scene segments calculated by the calculating unit 25 (step S6), and extracts multi-level chapter divisions by combining scene segments whose level of relevance exceeds the threshold value (step S7). The extracted multi-level chapter divisions are formed into a tree structure (step S8).

The overview of the flow of the digital-content-program structuring process performed by the units of the digital-content-program structuring device 1 has been provided. Now, the details of the process performed by each unit of the digital-content-program structuring device 1 are given below.

First, the play-list collecting process performed by the play-list collecting unit 21 is explained. FIG. 5 is a flowchart of the play-list collecting process. In the play-list collecting process performed by the play-list collecting unit 21, a list L consisting of groups of "play-list creating devices R, contents C, and play lists P" is initialized (step S11). The list L becomes data to be input for calculation of the frequencies of appearance of cut points and the relevance between the scene segments, which will be discussed later.

Thereafter, the play-list creating devices 30 (play-list creating devices R) are searched for throughout the network 20, and individually obtained (step S12).

FIG. 6 is a schematic diagram showing device information held by a play-list creating device 30. According to the drawing, a play-list creating device R1, which is one of the play-list creating devices 30 on the network 20, is an HDD recorder 1 of model A000, serial number 000-0001, having an IP address on the network 20 "xx.xx.xx.xx".

When the play-list creating device R is found in such a manner (Yes at step S12), contents stored in the content storage unit 31 of the play-list creating device R is searched for, and obtained one by one (step S13).

FIG. 7 is a schematic diagram showing content information stored in the content storage unit 31. According to FIG. 7, the title of content C1 is "Forest Friends", a TV program broadcasted by AAA at 10:00 am to 11:30 am on Jan. 23, 2006.

When the content C is found on the play-list creating device R in this manner (Yes at step S13), a play list created for the content C on the play-list creating device R and stored in the play-list storage unit 33 is searched for, and obtained one by one (step S14). On the other hand, when no content C is found on the play-list creating device R (No at step S13), the system control goes back to step S12 to search for a content stored in the content storage unit 31 of the next play-list creating device R.

Figures 8, 9:
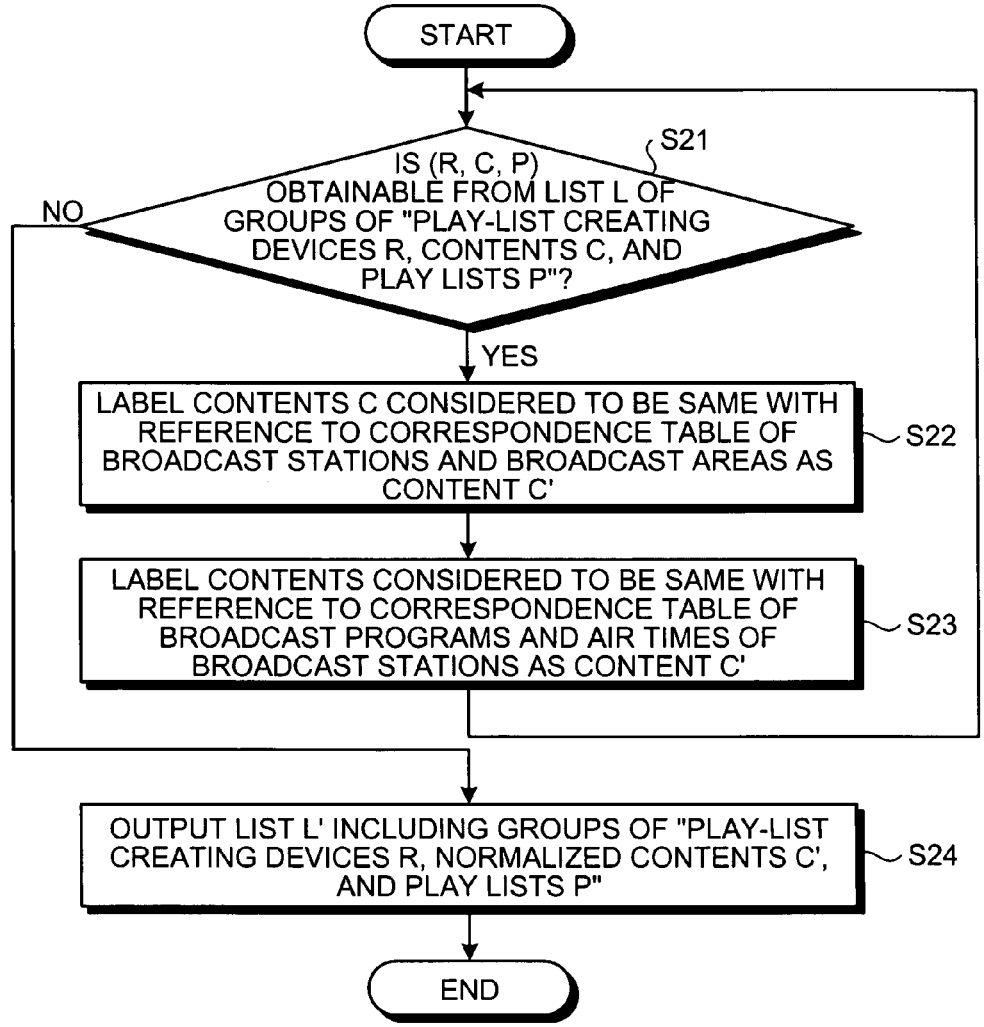
FIG. 8 is a schematic diagram showing play-list information.
FIG. 9 is a flowchart of a content normalizing process.

FIG. 8 is a schematic diagram showing play list information stored in the play-list storage unit 33. According to FIG. 8, a play list P1 is meant for the content C1 (a TV program under the title of "Forest Friends", broadcasted by AAA at 10:00 am to 11:30 am on Jan. 23, 2006), the program structure of which is described in FIG. 2 with cutoff points included therein. The play list P1 consists of a scene segment (opening and the first question) from 00:00:00 to 00:25:00 and another scene segment (the second question) from 00:30:00 to 00:55:00. As shown in FIG. 8, for the convenience of users, description of the scenes may be added to the play list information stored in the play-list storage unit 33. The play-list collecting unit 21, however, collects (columns of play-list identifiers, content identifiers, and scene segments) only, and does not have to collect the description of scenes.

When the play list P for the content C is found in the above manner (Yes at step S14), the play-list creating device R, the content C, and the play list P obtained at different steps are grouped together and added to the list L (step S15). On the other hand, when no play list P is found for the content C (No at step S14), the system control goes back to step S13 and searches for a play list P for the next content C.

The processes at steps S12 through S15 are repeated until the process on all the play-list creating devices 30 (play-list creating devices R) on the network 20 is completed (No at step S12).

When the process on all the play-list creating devices 30 (play-list creating devices R) on network 20 is completed (No at step S12), the created list L is output (step S16).

The process of normalizing the content performed by the content normalizing unit 22 is explained next. In outline, the list L collected by the play-list collecting unit 21 is sent to the content normalizing unit 22, and the content normalizing unit 22 performs the normalizing process on all the contents included in the list L. More specifically, the content normalizing unit 22 searches, from among the contents included in the list L, for contents that are physically different from one another but can be considered to logically match. The content normalizing unit 22 adds the same new content identifier to such contents. Determination as to whether the contents logically match one another may be made with reference to a correspondence table of broadcast stations and broadcast areas or of broadcast programs, broadcast stations, and air times. Otherwise, the determination may be made by requesting changes over time in the feature amounts of the content such as monophonic/stereophonic sound, sound level, and image brightness from the play-list creating device 30 that created the play list and using the changes over time in the feature amounts that are received in response. The content normalizing process incorporating such techniques is explained below.

The technique using the correspondence table is first explained. FIG. 9 is a flowchart of the content normalizing process based on a correspondence table of broadcast stations and broadcast areas and a correspondence table of broadcast programs, broadcast stations, and air times. If a group of "play-list creating device R, content C, and play list P" is obtainable from the list L input from the play-list collecting unit 21 (Yes at step S21), any contents C that are considered to be the same with reference to the correspondence table of the broadcast stations and broadcast areas are labeled as content C' (step S22), and any contents that are considered to be the same with reference to the correspondence table of broadcast programs and air times of broadcast stations are labeled as content C' (step S23). The above process is repeated until it is determined that all the groups of "play-list creating device R, content C, and play list P" are obtained from the list L input from the play-list collecting unit 21 (No at step S21). When all the groups of "play-list creating devices R, contents C, and play lists P" have undergone the process (No at step S21), the created list L' including the groups of "play-list creating devices R, contents C', and play lists P" is output (step S24).

It is assumed that a correspondence table of broadcast stations and broadcast areas and a correspondence table of broadcast programs and air times of broadcast stations are provided in advance, as shown in FIG. 10. Because it indicates that AAA and AAC are affiliated stations corresponding to each other, the content C1 and the content C5 listed in FIG. 7 are determined to be logically the same. Thus, the same content identifier C1' is attached to the content C1 and the content C5 in FIG. 7. It is also determined, with reference to the correspondence table of the broadcast programs, that the content "Forest Friends" broadcasted by AAB from 2:00 pm to 3:30 pm on Jan. 25, 2003, is logically the same, although it is not included in FIG. 7.

The technique using changes over time in feature amounts of the content is explained next. FIG. 11 is a flowchart of the content normalizing process with which changes over time in the feature amounts, such as monophonic/stereophonic sound, sound level, and image brightness are requested from the play-list creating device 30 that has created the play list and the changes over time in the feature amounts received in response are based on. When a group of "play-list creating device R, content C, and play list P" is obtainable from the list L that is input from the play-list collecting unit 21 (Yes at step S31), an inquiry about a change over time f(t) in the feature amount of the content C (feature amount of monophonic/stereophonic sound, sound level, image brightness, or the like) is sent to the play-list creating device 30 (play-list creating device R) (step S32). Any contents C that are considered to be the same with reference to the changes over time f(t) in the feature amounts of the contents are labeled as content C' (step S33). This process is repeated until it is determined that all the groups of "play-list creating device R, content C, and play list P" are obtained from the list L that is input from the play-list collecting unit 21 (No at step S31). When the process has been conducted on all the groups of "play-list creating devices R, contents C, and play lists P" (No at step S31), the created list L' of "play-list creating devices R, contents C', and play lists P" is output (step S34).

Figure 12:
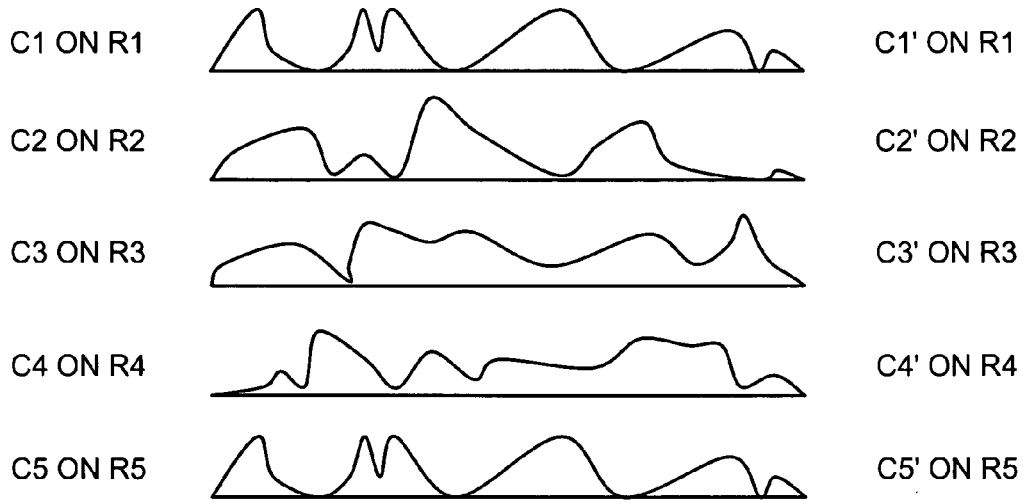
FIG. 12 is a schematic diagram for explaining changes over time in the feature amounts of content and the normalized contents.

For instance, when the changes in volume levels over time are calculated for the contents C1 to C5 on the play-list creating devices R1 to R5 as shown in FIG. 12, the patterns of the changes are exactly the same in the content C1 and the content C5. Thus, the content C1 and the content C5 are determined as logically the same, and the content identifier content C1' is added to both contents.

Although the feature amount that changes less costs less in calculation, this may increase the possibility of misjudging the contents that are not logically the same as the same. Thus, it is preferable to combine different feature amounts for the judgment.

The cutoff-point normalizing process performed by the cutoff-point normalizing unit 23 is explained next. In outline, the list L' whose contents have been normalized by the content normalizing unit 22 is sent to the cutoff-point normalizing unit 23, and the cutoff-point normalizing unit 23 executes a process of normalizing all the play lists included in the list L'. More specifically, the cutoff-point normalizing unit 23 corrects the times of the cutoff points that appear in the play lists of the list L' in accordance with a difference between the clock of the digital-content-program structuring device 1 and the clock of the content. To detect a difference between the clock of the digital-content-program structuring device 1 and the clock of the content, an inquiry about the current time may be sent to the play-list creating device 30, and a difference between the time of the digital-content-program structuring device 1 and the time received in response may be referred to. Otherwise, an inquiry about changes over time in feature amounts of monophonic/stereophonic sound, sound level, image brightness, and the like may be sent to the play-list creating device 30 that has created the play list, and the changes over time in the feature amounts that are received in response may be referred to. The cutoff-point normalizing process adopting these techniques is explained below.

Figure 13:
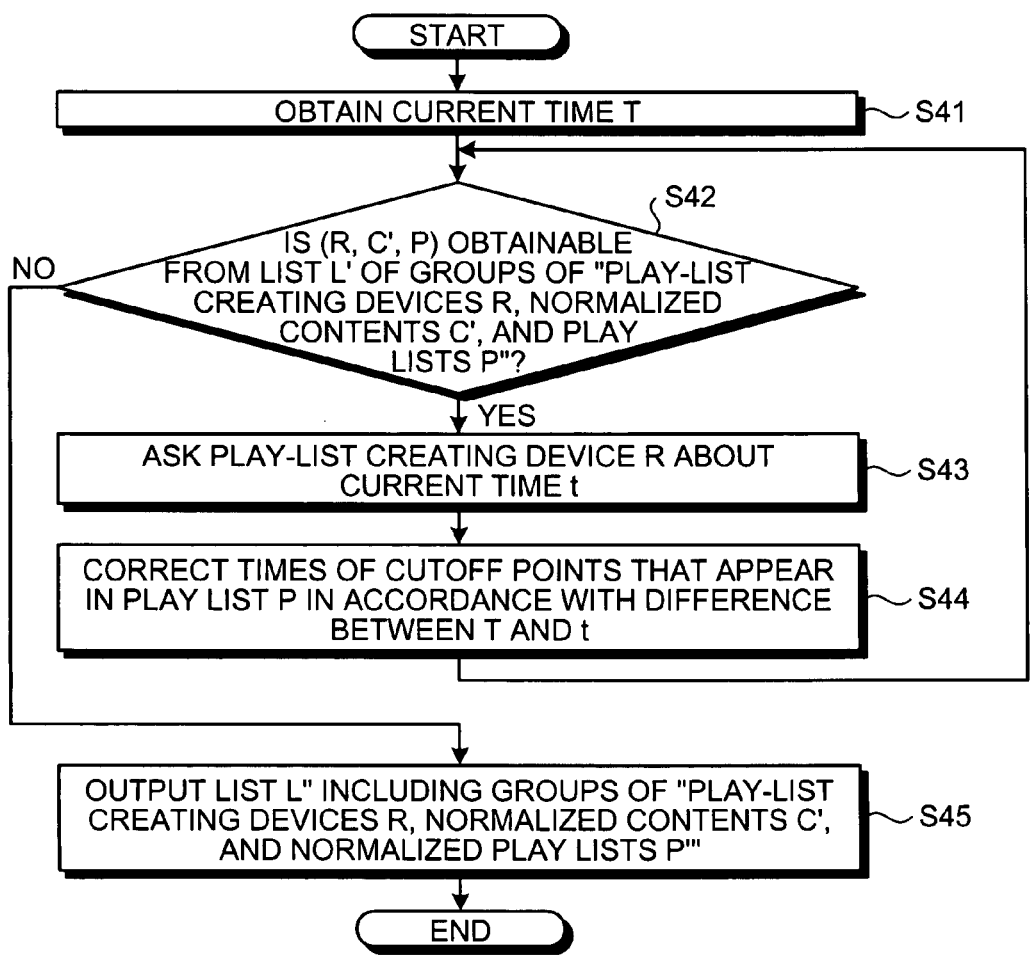
FIG. 13 is a flowchart of a cutoff-point normalizing process.

The technique using a difference between the time of the digital-content-program structuring device 1 and the time of the play-list creating device is first explained. FIG. 13 is a flowchart of the cutoff-point normalizing process using a difference between the clock of the digital-content-program structuring device 1 and the clock of the play-list creating device 30. A current time T of the digital-content-program structuring device 1 is obtained (step S41). When a group of "play-list creating device R, content C', and play list P" is obtainable from the list L' that is input from the content normalizing unit 22 (Yes at step S42), an inquiry about the current time t is sent to the play-list creating device 30 (play-list creating device R) (step S43). The times of the cutoff points that appear in the play list P are corrected in accordance with a difference between the current time T of the digital-content-program structuring device 1 and the current time t of the play-list creating device 30 (play-list creating device R) (step S44). This process is repeated until it is determined that all the groups of "play-list creating device R, content C', and play list P" are obtained from the list L' that is input from the content normalizing unit 22 (No at step S42). When the process has been conducted on all the groups of "play-list creating devices R, contents C', and play lists P" (No at step S42), the created list L" of the groups of "play-list creating devices R, contents C', and play lists P'" is output (step S45).

In short, with this technique, the time lags in the cutoff points that appear in the play list are corrected in accordance with a difference between the current time T obtained by the cutoff-point normalizing unit 23 and the current time t received from the play-list creating device 30 in response to an inquiry.

Figure 14:
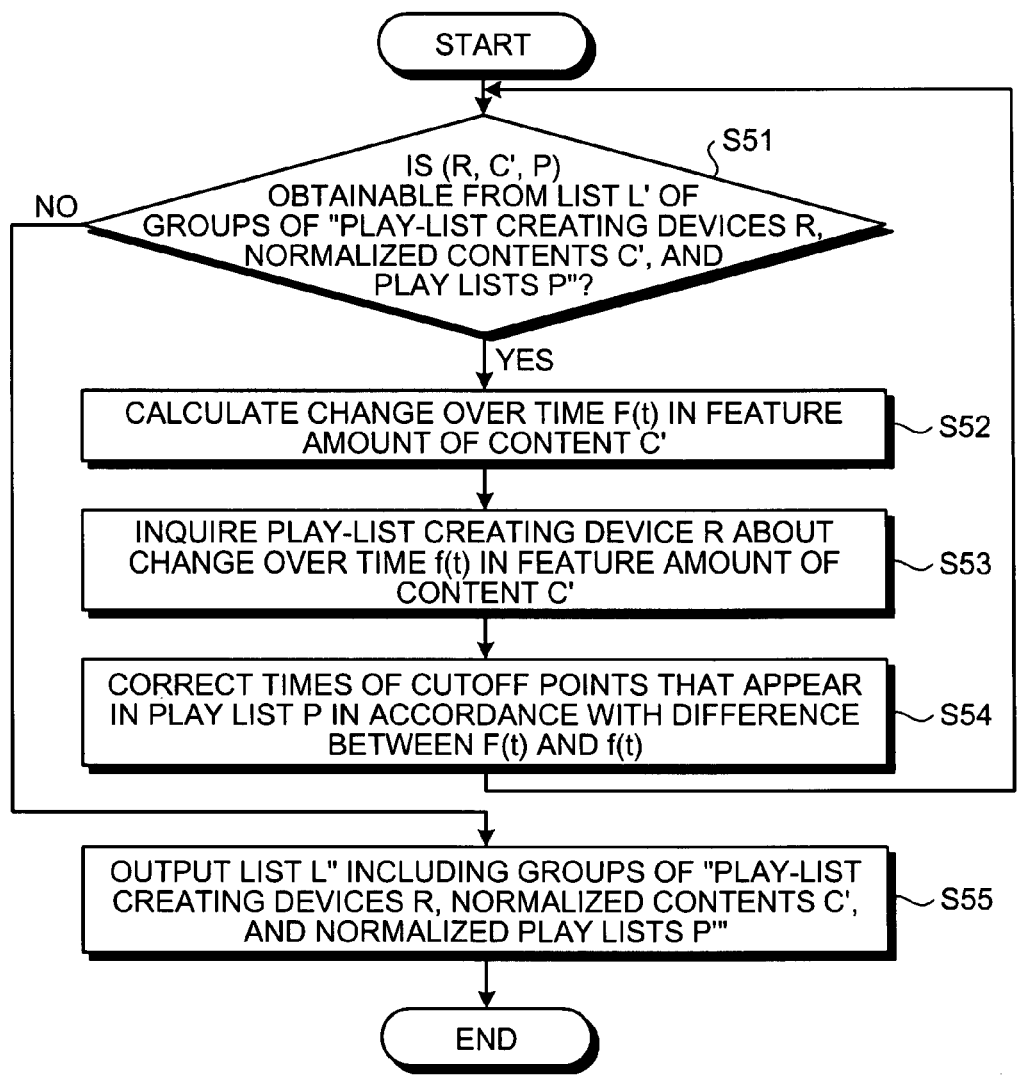
FIG. 14 is a flowchart of the cutoff-point normalizing process.

The technique using changes over time in feature amounts of the content is explained next. FIG. 14 is a flowchart of the cutoff-point normalizing process in which an inquiry about changes over time in feature amounts of monophonic/stereophonic sound, sound level, image brightness, and the like is sent to the play-list creating device 30 that has created the play list, and the changes over time in the feature amounts that are received in response are referred to. When a group of "play-list creating device R, content C', and play list P" is obtainable from the list L' that is sent from the content normalizing unit 22 (Yes at step S51), the change over time F(t) in the feature amount of the content C' (such as feature amounts of monophonic/stereophonic sound, sound level, image brightness, and the like) is calculated (step S52). An inquiry about the change over time f(t) in the feature amount of the content C' (feature amounts of monophonic/stereophonic sound, sound level, image brightness, and the like) is sent to the play-list creating device 30 (play-list creating device R) (step S53). The times of the cutoff points that appear in the play list P are corrected in accordance with a difference between the change over time F(t) and the change over time f(t) (step S54). This process is repeated until it is determined that all the groups of "play-list creating device R, content C', and play list P" are obtained from the list L' that is input from the content normalizing unit 22 (No at step S51). When the process has been conducted on all the groups of "play-list creating devices R, contents C', and play lists P" (No at step S51), the created list L" of the groups of "play-list creating devices R, contents C', and play lists P'" is output (step S55).

Figure 15:
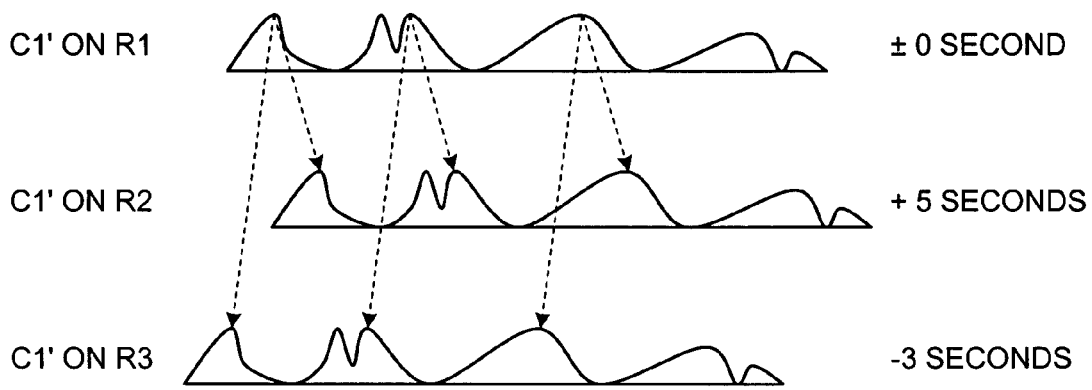
FIG. 15 is a schematic diagram for explaining changes over time in the feature amounts of content and discrepancies in time.

It is assumed that the changes over time in the volume level of the content C' normalized on each of the play-list creating devices R1 to R3 are calculated as indicated in FIG. 15. The times of the cutoff points that appear in each play list can be corrected with reference to the discrepancies between corresponding peaks and valleys.

Although a feature amount with a smaller change over time costs less in calculation, peaks and valleys that do not correspond to one another may be misjudged as corresponding, which results in an increased possibility of miscalculating discrepancies. Thus, it is preferable to combine different feature amounts together in making a judgment.

With either one of the techniques described above, the list L" in which the cutoff points that appear in the play list are normalized by the cutoff-point normalizing unit 23 is stored in the first storage unit 24 and input into the calculating unit 25.

Figure 16:
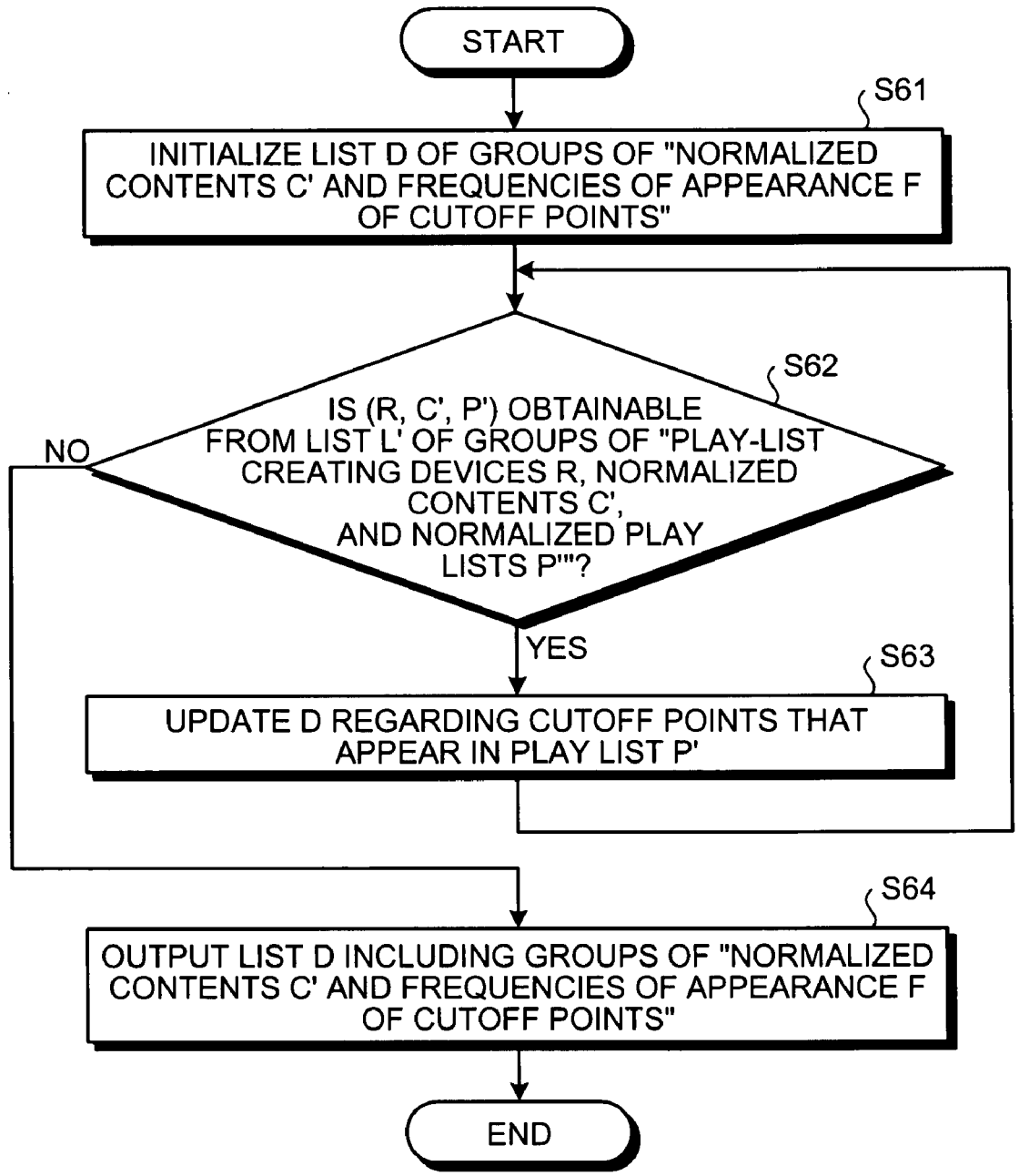
FIG. 16 is a flowchart of a scene-segment relevance calculating process.

A scene-segment relevance calculating process performed by the calculating unit 25 is explained next. FIG. 16 is a flowchart of the scene-segment relevance calculating process performed by the calculating unit 25. First, the calculating unit 25 initializes a list D including a group of "normalized content C' and frequency of appearance of cutoff points F" (step S61). Next, groups of "play-list creating unit R, the normalized content C', and normalized play list P'" stored in the first storage unit 24 are searched for and obtained one by one (step S62). Each time the normalized play list P' is obtained, the calculating unit 25 adds up the frequencies of cutoff points that appear in the play list P', and updates the corresponding positions in the content C' of the list D (step S63). The process at step S63 is repeated until it is determined that all the groups of "play-list creating unit R, the normalized content C', and normalized play list P'" that are stored in the first storage unit 24 are obtained (No at step S62). When the process is conducted on all the groups of "play-list creating unit R, the normalized content C', and normalized play list P'" (No at step S62), the list D including "normalized contents C' and frequencies of appearance of the cutoff points F" is input (step S64).

Figure 17A:
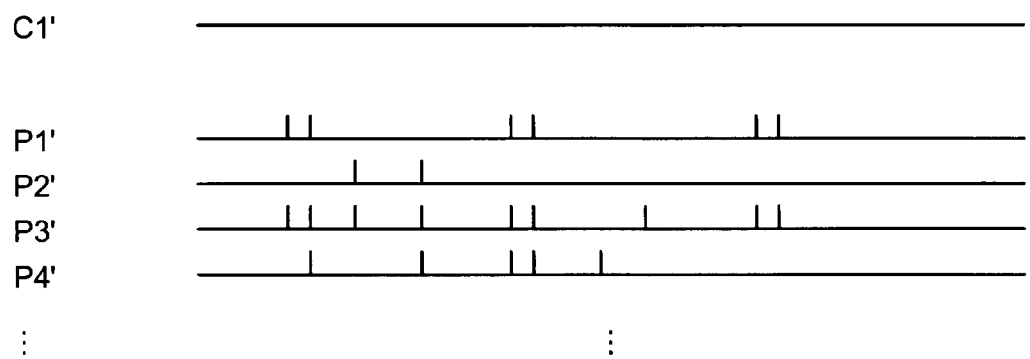
FIG. 17 is a schematic diagram showing examples of results of calculating the frequencies of appearance of cutoff points.
Figure 17B:
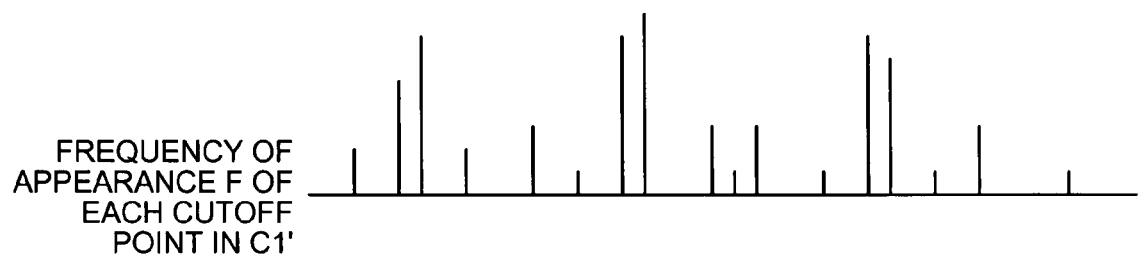

It is assumed that play lists as indicated in FIG. 17A are obtained in connection with the content C1'. The frequencies of appearance F of cutoff points are calculated as indicated in FIG. 17B. The frequency of appearance F of each cutoff point is calculated because it is considered that more users use a cutoff point that corresponds to a major breakpoint in the program structure of the content while less users use a cutoff point that corresponds to a minor breakpoint when creating a play list. In other words, higher frequency of appearance of a cutoff point is regarded as lower relevance between the scene segments before and after the cutoff point.

The list D for which the calculating unit 25 calculates the frequencies of appearance of cutoff points for each content is input into the extracting unit 26.

A chapter dividing process performed by the extracting unit 26 is explained next. In outline, the extracting unit 26 calculates multi-level threshold values from the frequencies of appearance of cutoff points in the list D. The cutoff points whose frequencies of appearance exceed the corresponding threshold values are extracted so that clusters of scene segments are extracted. multi-level chapter divisions are thereby realized. To calculate a multi-level threshold value from the frequencies of appearance of cutoff points, the number of chapter divisions calculated in advance from the length of the content may be used. Otherwise, the threshold value calculated from the maximum frequency of each cutoff point may be used. The processes of calculating the multi-level threshold value and extracting multi-level chapter divisions by adopting these techniques are explained below.

The technique based on the number of chapter divisions that is calculated in advance is first explained. FIG. 18 is a flowchart of a chapter division extracting process based on the number of chapter divisions that is calculated in advance from the length of the content. The extracting unit 26 initializes the list D' including a group of "normalized content C' and chapter divisions c" (step S71). Next, when a group of "normalized content C' and frequencies of appearance F" of cutoff points is obtainable from the list D including groups of "normalized content C' and frequencies of appearance F" that is input (Yes at step S72), the number of chapter divisions, N1, N2, or N3 . . . is obtained in correspondence with the length of the content C' and the desired coarseness (step S73). Then, after the number N1, N2, or N3 . . . of cutoff points are obtained in decreasing order of frequency of appearance and defined as chapter divisions c (step S74), (C', c) is added to the list D' (step S75). This process is repeated until it is determined that all the groups of "normalized content C' and frequency of appearance F of cutoff points" are obtained (No at step S72). When the process has been conducted on all the groups of "normalized contents C' and frequencies of appearance F of cutoff points" (No at step S72), the created list D' of "normalized contents C' and chapter divisions c" is output (step S76).

The number of chapter divisions may be calculated by an equation using a suitable coefficient:

$$N = \gamma LG + \delta$$

where the length of the content C' is L, and the coarseness of chapter divisions is G (1 for large segments, 2 for medium segments, and 3 for small segments). Otherwise, as indicated in FIG. 19, the calculation may be performed by preparing the correspondence table of the length of the content, the coarseness of chapter divisions, and the number of chapter divisions. In the calculation according to FIG. 19, the content C1' has a length of 1 hour and 30 minutes as indicated in FIGS. 7 and 10, which means 20 to 30 divisions if large segments are desired, 30 to 50 divisions if medium segments are desired, and 50 to 80 divisions if small segments are desired. Thus, 20 to 30, 30 to 50, or 50 to 80 cutoff points of the content C1' are obtained in decreasing order of frequency of appearance. The obtained cutoff points are defined as chapter divisions for the corresponding coarseness.

Figures 20, 21:
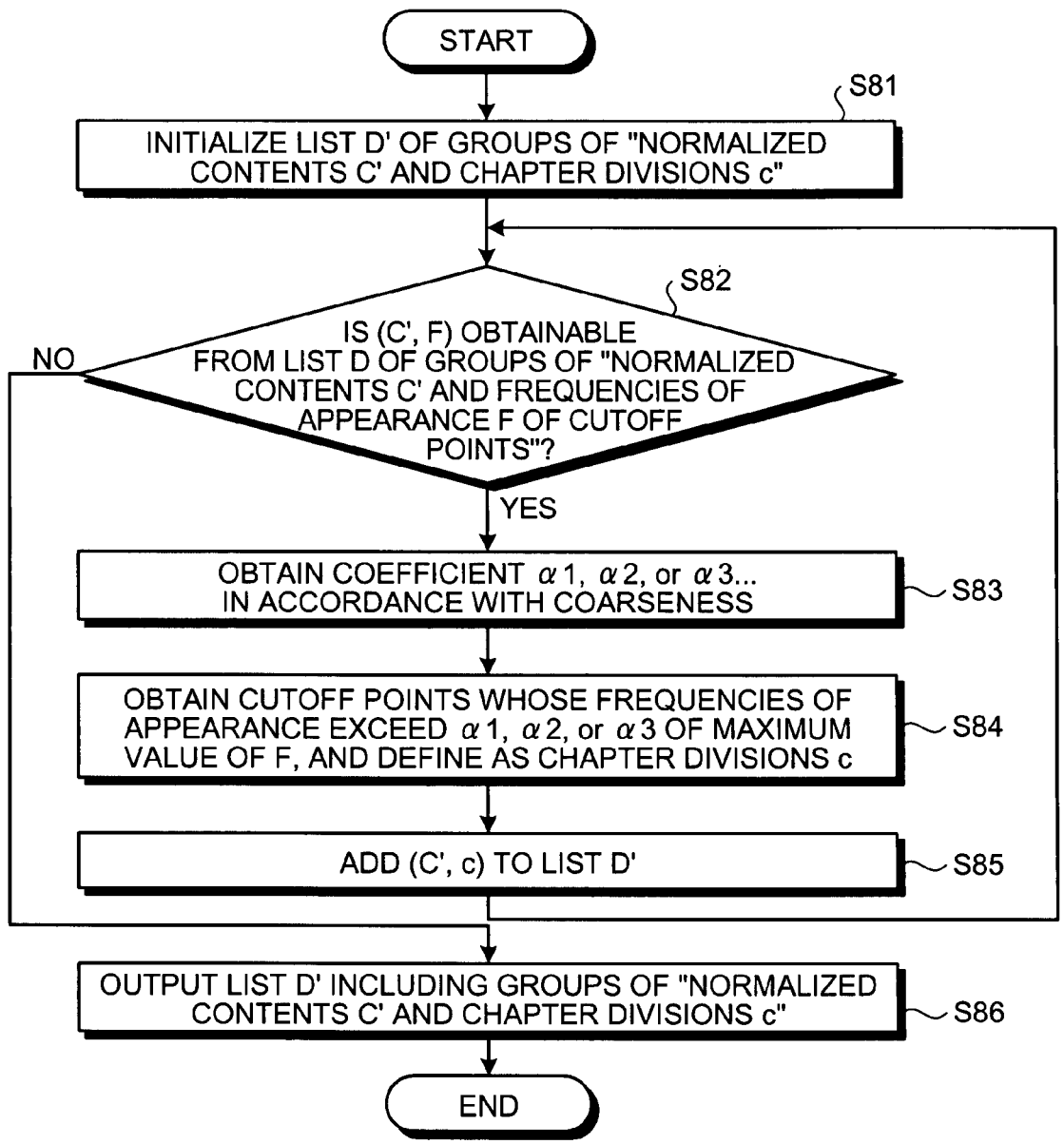
FIG. 20 is a flowchart of a chapter dividing process.
FIG. 21 is a schematic diagram showing an example of a correspondence for coarseness of chapter divisions and coefficients of a threshold value.

The technique of calculating the threshold value from the maximum frequency of appearance of each cutoff point is explained next. FIG. 20 is a flowchart of a chapter dividing process with which a threshold value is calculated from the maximum frequency of appearance of each cutoff point. The extracting unit 26 initializes the list D' including groups of "normalized contents C' and chapter divisions c" (step S81). When a group of "normalized content C' and frequencies of appearance F of cutoff points" is obtainable from the input list D' including groups of "normalized contents C' and frequencies of appearance F of cutoff points" (Yes at step S82), a coefficient (threshold value) $\alpha 1$, $\alpha 2$, or $\alpha 3$ is obtained in accordance with the coarseness (step S83). Cutoff points that exceed the threshold value $\alpha 1$, $\alpha 2$, or $\alpha 3$ with respect to the maximum of frequencies of appearance F of cutoff points are obtained and defined as chapter divisions c (step S84). Then, (C', c) are added to the list D' (step S85). The above process is repeated until it is determined that all the groups of "normalized contents C' and frequencies of appearance F of cutoff points" are obtained (No at step S82). When the process has been conducted on all the groups of "normalized contents C' and frequencies of appearance F of cutoff points" (No at step S82), the created list D' of "normalized contents C' and chapter divisions c" is output (step S86).

The threshold value may be calculated statistically from the shape of a graph for the frequencies of appearance F of cutoff points. Otherwise, a correspondence table of the coarseness of chapter divisions and the coefficients of threshold values may be prepared for the calculation, as shown in FIG. 21. When the table of FIG. 21 is used, cutoff points of the content C1' whose frequencies of appearance exceed ¼, 2/4, or ¾ of the maximum frequency of appearance are obtained, and the obtained cutoff points are defined as chapter divisions for the targeted coarseness.

Figures 22A, 22B, 22C:
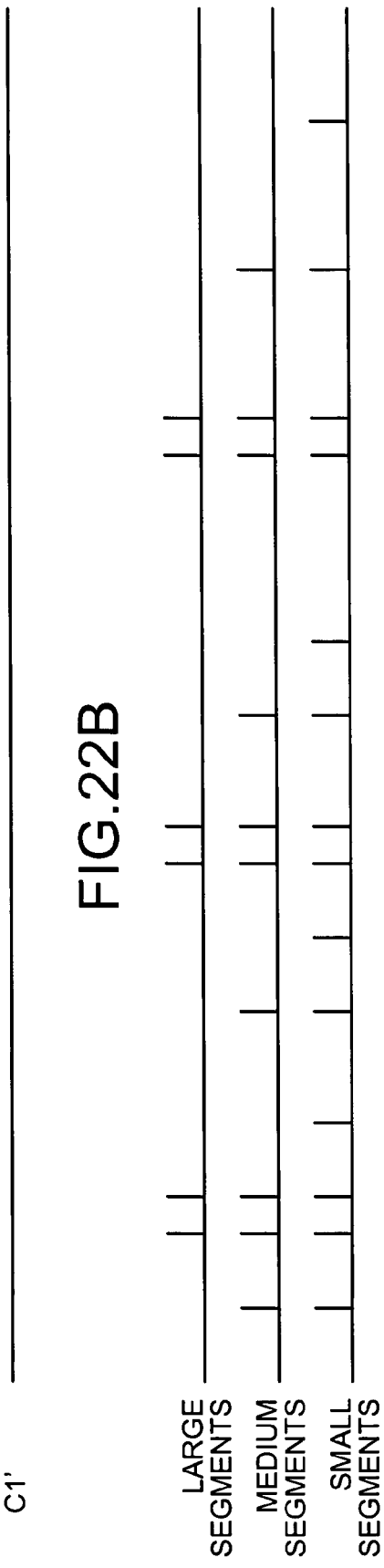
FIGS. 22A to 22C are schematic diagrams showing chapter divisions.

In the above extraction of chapter divisions, cutoff points that are included in larger-segment chapter divisions are always included in smaller-segment chapter division as indicated in FIGS. 22A to 22C. The extracting unit 26 outputs, as final chapter divisions of the content C1', the tree structure attained from the chapter divisions for different coarseness as indicated in FIG. 23, and stores the structure in the second storage unit 27.

Finally, a chapter division distributing process performed by the chapter-division distributing unit 28 is explained. In outline, when chapter divisions that correspond to the content stored in the content storage unit 31 of any play-list creating device 30 on the network 20 is present in the second storage unit 27, the chapter-division distributing unit 28 distributes the chapter divisions to the content storage unit 31 of the play-list creating device 30 via the network 20.

Figure 24:
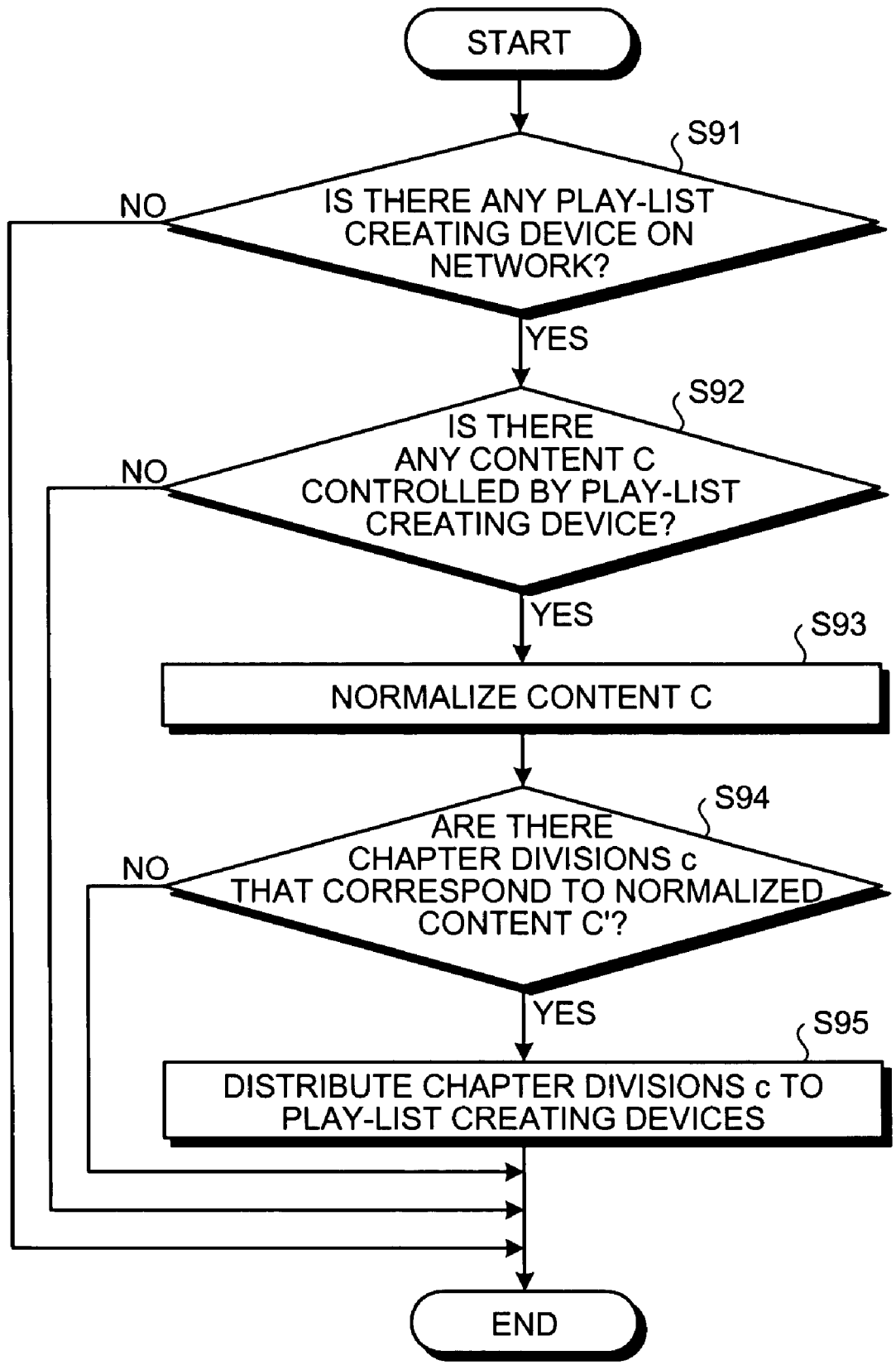
FIG. 24 is a flowchart of a chapter division distributing process.

FIG. 24 is a flowchart of the chapter division distributing process performed by the chapter-division distributing unit 28. The chapter-division distributing unit 28 searches for play-list creating devices 30 throughout the network 20, and obtains them one by one (Yes at step S91). The obtained play-list creating devices 30 are placed under the monitoring of the chapter-division distributing unit 28, and a target content C is obtained via the network 20 every time of content control (Yes at step S92). The content C is input to the content normalizing unit 22, where the process of normalizing the content is executed (step S93). When the chapter divisions c that correspond to the normalized content C' are present in the second storage unit 27 (Yes at step S94), the chapter-division distributing unit 28 distributes these chapter divisions to the play-list creating devices 30 via the network 20 (step S95). This process facilitates locating and searching operations for the target scene in accordance with the structure of the program.

According to the embodiment, by collecting play lists that are created from a video content such as a TV program and a DVD in which a time series is defined, and extracting chapter divisions as a cluster of scene segments in accordance with the level of relevance of the scene segments, the chapter divisions structured into a tree form are extracted from the content. By adding metadata to the chapter divisions, the target scene can be readily located or searched for in accordance with the structure of the content with high accuracy. It is considered that more users use a cutoff point that corresponds to a major breakpoint in the program structure of the content while less users use a cutoff point that corresponds to a minor breakpoint when creating a play list. As a result, the tree-structured chapter divisions reflect the structure of the program.

Figure 25:
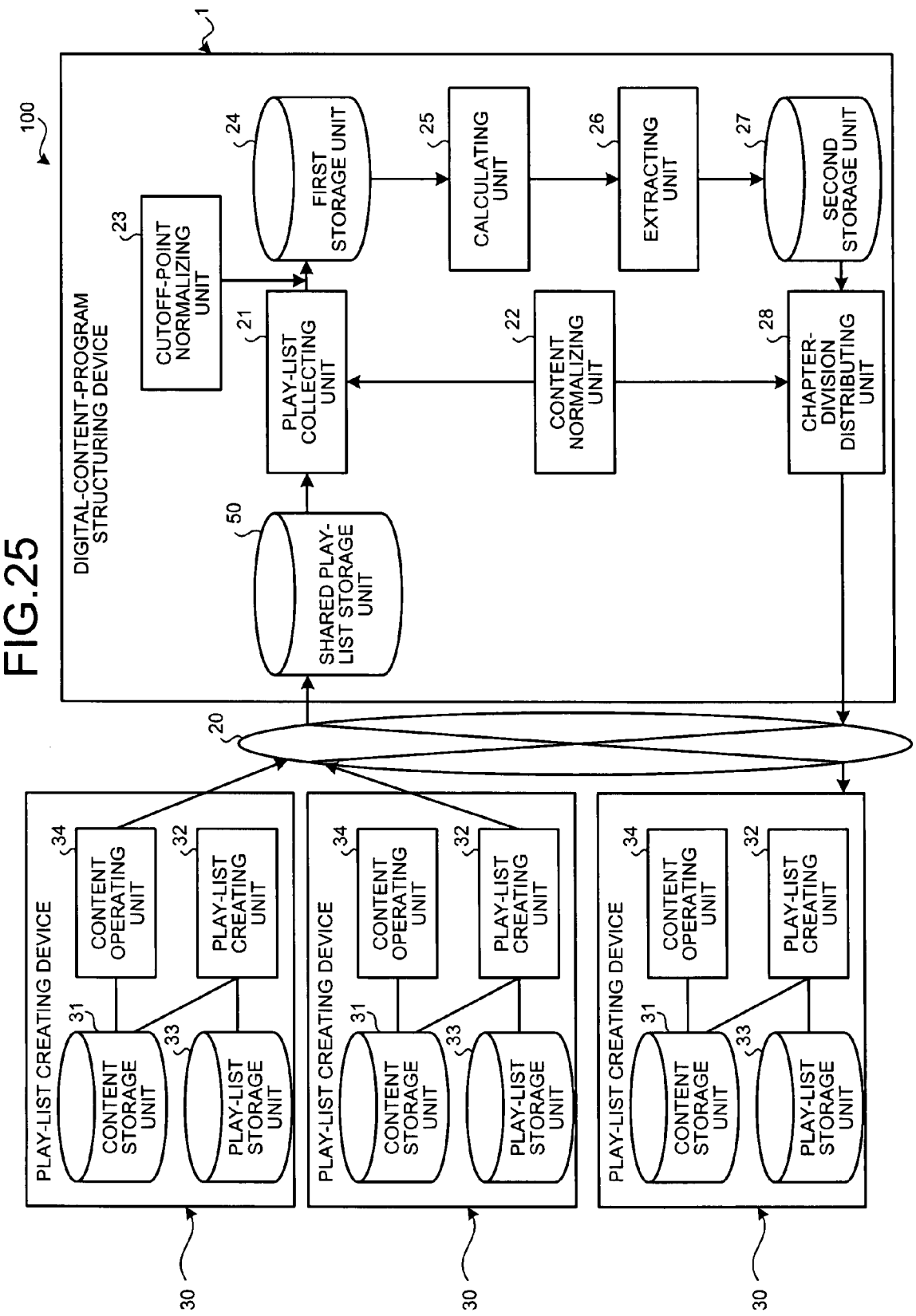
FIG. 25 is a diagram showing a system structure explaining a modified example of the structure of the program structuring system.

According to the embodiment, the play-list collecting unit 21 of the digital-content-program structuring device 1 is described as directly collecting play lists from play-list creating devices 30 that are found on the network 20. However, the present invention is not limited thereto. For instance, as shown in FIG. 25, the digital-content-program structuring device 1 may include a shared play-list storage unit 50 with which play lists created by a user on the play-list creating unit 32 of a play-list creating device 30 can be put on public and registered by way of the network 20. Then, the play lists may be collected indirectly from the shared play-list storage unit 50. The shared play-list storage unit 50 may be arranged inside the system structure of the digital-content-program structuring device 1, as illustrated in FIG. 25, or may be placed on the network 20. When the shared play-list storage unit 50 is placed on the network 20, there may be more than one shared play-list storage unit 50.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A program structuring device comprising:
   a play-list collecting unit that collects a play list for a content in which a time series is defined;
   a first storage unit that stores cutoff points that appear in the play list and are breakpoints of a program structure of the content, in correspondence with a frequency of appearance of each of the cutoff points;
   a calculating unit that calculates a level of relevance between scene segments defined by the cutoff points from the frequency of appearance of each of the cutoff points;
   an extracting unit that extracts multi-level chapter divisions based on the level of relevance; and
   a second storage unit that stores the extracted multi-level chapter divisions structured into a tree form.

2. The device according to claim 1, wherein
   the calculating unit calculates the number of the multi-level chapter divisions from a length of the content, and
   the extracting unit extracts the multi-level chapter divisions by selecting chapter divisions in order of decreasing frequencies of appearance of the cutoff points until the number of chapter divisions reaches calculated number of chapter divisions.

3. The device according to claim 1, wherein
   the calculating unit calculates a plurality of multi-level threshold values from a maximum frequency of appearance of the cutoff points, and
   the extracting unit extracts the multi-level chapter divisions by selecting cutoff points whose frequencies of appearance exceed the threshold values.

4. The device according to claim 1, further comprising a content normalizing unit that finds contents that are considered to logically match each other even if the contents are physically different, from among all contents for which play lists are created, and adds a same new content identifier to the found contents.

5. The device according to claim 4, wherein the content normalizing unit adds the same content identifier to the contents when the contents are determined as matching each other with reference to a correspondence table of broadcast stations and broadcast areas and a correspondence table of broadcast programs and air times of broadcast stations, even if the contents are physically different.

6. The device according to claim 4, wherein the content normalizing unit adds the same content identifier to the contents when the contents are determined as matching each other with reference to a change over time in a feature amount of each of the contents that is received in response to an inquiry about the change over time in the feature amount, even if the contents are physically different.

7. The device according to claim 1, further comprising a cutoff-point normalizing unit that performs a normalizing process to correct times of the cutoff points that appear in the play list in accordance with a discrepancy between a clock of the program structuring device and a clock of a play-list creating device that creates the play list.

8. The device according to claim 7, wherein the cutoff-point normalizing unit detects the discrepancy between the clock of the program structuring device and the clock of the play-list creating device based on a time that is received in response to an inquiry that is made about a current time to the play-list creating device that creates the play list.

9. The device according to claim 7, wherein the cutoff-point normalizing unit detects the discrepancy between the clock of the program structuring device and the clock of the play-list creating device based on a change over time in a feature amount of the content that is received in response to an inquiry that is made about the change over time in the feature amount to the play-list creating device that creates the play list.

10. The device according to claim 1, further comprising a chapter-division distributing unit that monitors content storage devices on a network, and distributes the chapter divisions to the content storage devices when the chapter divisions are present, the chapter divisions corresponding to the content in accordance with a content operation performed by one of the content storage device.

11. A program structuring method executed by a computer comprising:
    collecting a play list for a content in which a time series is defined;
    storing in a first storage unit cutoff points that appear in the play list and are breakpoints of a program structure of the content, in correspondence with a frequency of appearance of each of the cutoff points;
    calculating a level of relevance between scene segments defined by the cutoff points from the frequency of appearance of each of the cutoff points;
    extracting multi-level chapter divisions based on the level of relevance; and
    storing in a second storage unit the extracted multi-level chapter divisions structured into a tree form.

12. A computer program product having a computer readable storage medium storing programmed instructions for structuring a content, wherein the instructions, when executed by a computer, cause the computer to perform:

collecting a play list for a content in which a time series is defined;

storing in a first storage unit cutoff points that appear in the play list and are breakpoints of a program structure of the content, in correspondence with a frequency of appearance of each of the cutoff points;

calculating a level of relevance between scene segments defined by the cutoff points from the frequency of appearance of each of the cutoff points;

extracting multi-level chapter divisions based on the level of relevance; and storing in a second storage unit the extracted multi-level chapter divisions structured into a tree form.

* * * * *